United States Patent
Plzak

(10) Patent No.: US 6,720,284 B1
(45) Date of Patent: Apr. 13, 2004

(54) AU/FE$_2$O$_3$ CATALYST MATERIALS, METHOD FOR THE PRODUCTION THEREOF AND THEIR USE

(75) Inventor: Vojtech Plzak, Plochingen (DE)

(73) Assignee: Zentrum fur Sonnenenergie- und Wasserstoff Forschung Baden-Wurttemberg Gemeinnutizige Stiftung, Stuttgart (DE)

( * ) Notice: Subject to any disclaimer, the term of this patent is extended or adjusted under 35 U.S.C. 154(b) by 0 days.

(21) Appl. No.: 09/762,567

(22) PCT Filed: Aug. 11, 1999

(86) PCT No.: PCT/DE99/02528

§ 371 (c)(1),
(2), (4) Date: Feb. 8, 2001

(87) PCT Pub. No.: WO00/09259

PCT Pub. Date: Feb. 24, 2000

(30) Foreign Application Priority Data

Aug. 12, 1998 (DE) .......................................... 198 36 585

(51) Int. Cl.$^7$ ................................................ B01J 23/76
(52) U.S. Cl. ...................... 502/330; 502/306; 502/314; 502/316; 502/328
(58) Field of Search ............................... 502/338, 243, 502/330, 316, 314, 328, 306

(56) References Cited

U.S. PATENT DOCUMENTS

| | | | |
|---|---|---|---|
| 4,698,324 A | | 10/1987 | Haruta et al. ................ 502/243 |
| 4,839,327 A | * | 6/1989 | Haruta et al. ................ 502/243 |
| 5,051,394 A | * | 9/1991 | Haruta et al. ................ 502/324 |
| 5,506,273 A | * | 4/1996 | Haruta et al. ................ 502/244 |
| 5,580,839 A | * | 12/1996 | Huffman et al. ............ 502/202 |

FOREIGN PATENT DOCUMENTS

| | | |
|---|---|---|
| DE | 42 38 640 A1 | 6/1993 |
| EP | 0 395 856 | 11/1990 |

OTHER PUBLICATIONS

Wagner, F.E., et al. "Mössbauer characterisation of gold/iron oxide catalysts", *J. Chem. Soc.*, Faraday Trans., vol. 93 (18) pp. 3403–3409, (1997). no month.

* cited by examiner

*Primary Examiner*—Stuart L. Hendrickson
*Assistant Examiner*—Peter J Lish
(74) *Attorney, Agent, or Firm*—Nath & Associates PLLC; Gary M. Nath; Jerald L. Meyer

(57) ABSTRACT

The invention relates to an Au/Fe$_2$O$_3$ catalyst comprised of a particle-shaped, co-catalytically active Fe$_2$O$_3$ supporting material with metallic Au clusters deposited thereupon which have a diameter of less than 4.5 nm. The catalyst materials can be obtained by: a) reacting a water-soluble Fe(III) salt in an aqueous medium with a base; b) impregnating the hydroxide gel which is formed thereby and which is still moist with a solution of a water-soluble Au compound in order to deposit complexed Au clusters on the surface of the hydroxide gel; c) removing water from the suspension of the reaction product formed thereby; d) subjecting the dried reaction product to a calcination at temperatures ranging from 350 and 700° C. The inventive catalyst material is especially suited for selective low-temperature CO oxidation in reformate hydrogen which is used as combustible gas for polymer electrolyte membrane (PEM) fuel cells.

18 Claims, No Drawings

AU/FE₂O₃ CATALYST MATERIALS, METHOD FOR THE PRODUCTION THEREOF AND THEIR USE

The present invention relates to Au/Fe$_2$O$_3$ catalyst materials made from a particulate, co-catalytically active Fe$_2$O$_3$ support material with metallic Au clusters deposited thereon which have a diameter of less than 4.5 nm, various processes for their production and their use, particularly for selective low-temperature CO oxidation in reformate hydrogen.

The CO content in reformate hydrogen from a hydrocarbon reformer is about 5,000 ppm or over 10,000 ppm to 20,000 ppm immediately downstream of a methanol reformer. When using such a reformate hydrogen as combustible gas in polymer-electrolyte-membrane (PEM) fuel cells, this CO must be reduced almost completely, that is to about 30 ppm maximum not to poison the Pt/Ru—C anodes of the PEM fuel cell conventionally used. To reduce the CO content in reformate hydrogen, there are several chemical engineering concepts, of which selective CO oxidation is currently preferred for mobile applications and small stationary plants for reasons relating to cost and selectivity, but also because of the comparatively high space-time yield.

This oxidative CO removal is traditionally carried out in a multi-stage reactor by means of known high-temperature catalysts, for example Pt/Al$_2$O$_3$, at 200° C. The control of such a reactor system for continuously guaranteeing a residual CO content of about 30 ppm at different load states of the fuel cell is however extremely expensive and complicated. One of the main reasons for this, which occurs particularly during transfer to weak loads with larger residence times associated therewith, is the retro-shift reaction (3) competing with the reaction equations (1) and (2) shown below, and which has to be repressed, for example by rapid increase of oxygen supply while reducing the required selectivity.

$$CO + \tfrac{1}{2}O_2 \rightarrow CO_2 \quad (1)$$

$$H_2 + \tfrac{1}{2}O_2 \rightarrow H_2O \quad (2)$$

$$CO_2 + H_2 \rightarrow CO + H_2O \quad (3)$$

Catalyst materials have been developed, in which the Pt has been replaced by Ru or a different Pt group metal, and which have the same activity and selectivity as the traditional Pt/Al$_2$O$_3$ catalyst material in the temperature range from 120 to 150° C. at comparable noble metal content.

For reasons relating to kinetics and process technology, it is advantageous to allow CO coarse cleaning to proceed in the temperature range from 190 to 230° C. in a fixed bed reactor operating as isothermally as possible and filled with traditional Pt/Al$_2$O$_3$ pellets. The second or last cleaning stage (CO fine cleaning at CO starting contents of 1,000 to 2,000 ppm) is then carried out at considerably lower temperatures, for example at 120° C., using the above-mentioned catalyst materials.

Furthermore, it has been proposed to shift the CO fine cleaning to the working region of the PEM fuel cell, that is at temperatures up to 80° C., but for which a low-temperature CO oxidation catalyst is required.

It is known that metal oxide-supported Au catalysts show high catalytic activity during low-temperature oxidation of CO even in reducing atmosphere. Hence, it can be seen from Journal of Catalysis 168 (1997) 125–127, that an Au catalyst (Au/MnO$_x$ catalyst) supported on manganese oxides may be used for selective oxidation of CO in hydrogen. The production of the Au/MnO$_x$ catalyst is effected by coprecipitation of an aqueous solution of tetrachloroauric acid and manganese nitrate with an aqueous lithium carbonate solution, drying and calcining of the coprecipitate in air at 300° C. The calcined sample thus consists mainly of metallic gold particles and MnCO$_3$. After measuring the catalytic activity for CO oxidation in hydrogen for one day, decomposition of MnCO$_3$ occurred with formation of crystalline manganese oxides, MnO, Mn$_3$O$_4$ and Mn$_2$O$_3$. In addition, there was sintering of the gold particles, wherein an average particle diameter of 2.8 nm was obtained. However, the CO conversion rate of such a catalyst material is relatively low and not satisfactory for practical application.

Applied Catalysis A: General 134 (1996) 275–283 reports on the low-temperature water gas shift reaction on Au/Fe$_2$O$_3$ catalysts produced by coprecipitation. It can be seen from this that a higher catalytic activity results with smaller gold particle diameter. The CO conversion rate of an Au/Fe$_2$O$_3$ catalyst material produced by coprecipitation is however likewise not satisfactory.

German Offenlegungsschrift 4 238 640 describes Au/Fe$_2$O$_3$ catalysts for hydrogenating CO and CO$_2$, which likewise are produced by mixed precipitation of a gold compound and an iron salt.

The object of the present invention is to provide an Au/Fe$_2$O$_3$ catalyst material having increased activity and selectivity, particularly for low-temperature CO oxidation, and adequate long-term stability, and processes for its production.

This object is achieved by a catalyst material according to claims 1 and 3 and processes according to claims 7, 8 and 9. Advantageous or preferred embodiments of the inventive object are given in the sub-claims.

Accordingly, the object of the invention is an Au/Fe$_2$O$_3$ catalyst material made from a particulate, co-catalytically active Fe$_2$O$_3$ support material with metallic Au clusters deposited thereon which have a diameter of less than 4.5 nm, which can be obtained by a) reacting a water-soluble Fe(III) salt in an aqueous medium with a base, b) impregnating the still moist hydroxide gel thus formed with a solution of a water-soluble Au compound to deposit complexed Au clusters on the surface of the hydroxide gel, c) removing water from the suspension of the reaction product thus formed, and d) subjecting the dried reaction product to calcining at temperatures between 350 and 700° C.

According to a preferred embodiment, this catalyst material also contains at least one Fe$_2$O$_3$ sinter inhibitor selected from Al$_2$O$_3$, Cr$_2$O$_3$ and MgO.

The object of the invention is also an Au/Fe$_2$O$_3$ catalyst material made from a particulate, co-catalytically active Fe2O$_3$ support material containing at least one Fe$_2$O$_3$ sinter inhibitor selected from Al$_2$O$_3$, Cr$_2$O$_3$ and MgO and with metallic Au clusters deposited thereon which have a diameter of less than 4.5 nm, which can be obtained by:

i) simultaneously reacting a water-soluble Fe(III) salt, at least one water-soluble salt of Al, Cr, Mg and a water-soluble Au compound in an aqueous medium with a base, ii) removing water from the suspension of the reaction product thus formed, and iii) subjecting the dried reaction product to calcining at temperatures between 350 and 700° C.

The catalyst material of the invention preferably contains 2–8 wt. % Au, since the best results are obtained with such a gold deposit.

Furthermore, it is desirable that the catalyst material of the invention has as high as possible specific surface area, preferably of at least 50 m$^2$/g according to the BET method. Furthermore, the Au clusters in the catalyst material of the invention have as high as possible a degree of dispersion, so that the Au clusters preferably have a diameter of less than 4 nm, also preferably of 1–3 nm.

A high specific oxide surface area and a high degree of dispersion for the Au clusters are particularly advantageous as regards kinetic points of view, since the step determining the reaction rate during CO oxidation takes place on the gold-iron oxide boundary. The degree of dispersion of the gold is therefore very important with regard to the CO conversion rate for the same Au deposit.

Regarding the CO selectivity of the catalyst materials of the invention, it has been shown that the selectivity increases for a temperature reduction from, for example 80 to 20° C. This can be explained in that at lower temperatures CO is generally absorbed more strongly than H$_2$. However, the rate of CO oxidation also drops with a reduction in temperature.

The Au/Fe$_2$O$_3$ catalyst materials of the invention show an excellent long-term stability. For example the catalyst material of the invention shows no change on one-week long storage under real reformer gas atmosphere with traces of oxygen at 80° C. The presence of 0.3 to 1% oxygen in the reformer gas suppresses the reduction of Fe$_2$O$_3$ to form Fe$_3$O$_4$ and the formation of FeCO$_3$.

Investigations have shown that the CO oxidation activity of the Au/Fe$_2$O$_3$ catalyst of the invention is higher by at least a factor 50, for comparable gold particle size between 2.5 and 4.5 nm, than for the known Au/MnO$_x$ catalyst (see also examples).

In one embodiment of the process of the invention, the catalyst material is not produced by coprecipitation, but a reaction of a water-soluble Fe(III) salt is initially effected in an aqueous medium with a base with formation of an iron oxide precursor, namely an iron hydroxide gel, wherein in a second step immediately thereafter, the still moist hydroxide gel is impregnated with a solution of a water-soluble Au compound to deposit complexed Au clusters on the surface of the hydroxide gel in the finest distribution. After removing water, the dried reaction product is then subjected to calcining at temperatures between 350 and 700° C.

The production process of the invention permits a better, that is independent, control of the optimised pre-structures of the two reaction components. Hence, for example during the first precipitation by suitable temperature control via the grain growth rate of Fe(O) (OH)$_x$ precursor matrix, the content of surface hydroxyl groups and the water adsorbates may be adjusted not only in the hydroxide gel itself, but in the end in the pre-dried end product. Following on from that there is deposition using the dissociated, anionic Au complex, for example in the form of an [Au(Cl)$_{4-z}$(OH)$_z$]$^-$ complex when using tetrachloroauric acid as the water-soluble Au compound.

According to the invention, much smaller Au clusters having an average diameter of less than 4.5 nm, in particular between 1 and 3 nm, can be fixed on the Fe$_2$O$_3$ support material by this process of sequential precipitation than by the known coprecipitation, in which at best gold islands having a diameter of about 4.5 nm are obtained. The increased degree of dispersion of the gold achieved according to the invention facilitates a CO conversion increase per gram of gold by a factor of 3 to 5.

According to a modified embodiment of the process of the invention described above, the first step of conversion of a water-soluble Fe(III) salt takes place in the presence of at least one water-soluble salt of Al, Cr or Mg in order to obtain a catalyst material which also contains at least one Fe$_2$O$_3$ sinter inhibitor selected from Al$_2$O$_3$, Cr$_2$O$_3$ and MgO.

In a third embodiment, the Au/Fe$_2$O$_3$ catalyst material containing at least one Fe$_2$O$_3$ sinter inhibitor selected from Al$_2$O$_3$, Cr$_2$O$_3$ and MgO is produced according to a process, which comprises the following steps:

i) simultaneously reacting a water-soluble Fe(III) salt, at least one water-soluble salt of Al, Cr, Mg and a water-soluble Au compound in an aqueous medium with a base, ii) removing water from the suspension of the reaction product thus formed, and iii) subjecting the dried reaction product to calcining at temperatures between 350 and 700° C.

The effect of the oxides Al$_2$O$_3$, Cr$_2$O$_3$ or MgO, which have grown into the Fe$_2$O$_3$ crystal matrix and are formed after calcining, consists in preventing the slow sintering of haematite ($\alpha$-Fe$_2$O$_3$) or magnetite (Fe$_3$O$_4$) substrate and the migration and coagulation of the gold clusters during use of the catalyst material. The use of MgO as "spacer" is thus particularly preferred according to the invention, since the two Fe and Mg oxide precursors thus do not exist separately from one another during the production of the catalyst material, but as an Mg—Fe compound, for example as Mg$_6$Fe$_2$CO$_3$(OH)$_{16}$.4H$_2$O (pyroaurite), together with amorphous Fe$_2$O$_3$. A very homogeneous mixture of the two oxides is thus achieved during calcining and the "spacer" effect of MgO on the Fe$_2$O$_3$ or on the MgFe$_2$O$_4$ precursor is maximised. At the same time, the mobility of the Au particles on the oxidic surface is thus restricted even during the heating time of the calcining step, as a result of which very small gold clusters are preserved. Furthermore, it may be assumed that the amorphous MgO increases the catalytic synergistic effect of molecular oxygen promotion or cleavage on the Fe$_2$O$_3$ surface. Finally, the carbon dioxide, which escapes as gas during calcining at about 350–400° C., effects the formation of a secondary gas pore structure, which is desirable in the subsequent formation of catalyst pellets or in the production of a pressed catalyst insert sheet.

In the process of the invention, the precipitation and impregnation steps are preferably carried out at temperatures of 40–95° C., also preferably at 60–85° C.

The pH value in the precipitation and impregnation steps is preferably 6–10, also preferably 7–9.

Suitable bases are known metal hydroxides and/or metal carbonates, wherein preferably NaOH and/or Na$_2$CO$_3$, in particular Na$_2$CO$_3$, are used.

The water-soluble salts of Al, Cr or Mg are preferably used in a proportion of 0.1–3.0 moles, also preferably 0.1–1.0 mole, and still further preferably 0.1–0.5 mole, per mole of Fe.

Suitable water-soluble gold compounds are, for example tetrachloroauric acid or tetranitratoauric acid, wherein tetrachloroauric acid is particularly preferred. Fe(NO$_3$)$_3$ is preferably used as the water-soluble Fe(III) salt, and may alternatively contain water of crystallisation.

Calcining is effected suitably at temperatures between 350 and 700° C., preferably between 350 and 500° C., also preferably between 350 and 400° C., wherein the last-mentioned temperature range is used particularly when none of the sinter inhibitors mentioned are used.

The catalyst material of the invention is suitable, for example for selective CO oxidation in reformate hydrogen, for methanisation, for CO conversion or for oxidative removal of CO and of hydrocarbons from air. The use for selective low-temperature CO oxidation in reformate hydrogen for PEM fuel cells is particularly preferred. The catalyst material of the invention may thus be processed to form pellets according to traditional processes or be pressed to form a catalyst insert sheet.

The following examples illustrate the invention.

COMPARATIVE EXAMPLE 1

According to the process described in Applied Catalysis A: General 134 (1996) 275–283, 50.5 g of $Fe(NO_3)_3.9H_2O$ and 1.12 g of $HAuCl_4.3H_2O$ are dissolved in 125 ml of deionised water and, together with a 1 M $Na_2CO_3$ solution, added dropwise to 150 ml of water pre-heated at 80° C. with intensive stirring. The pH value is thus adjusted to 7.9 to 8.1 and the temperature is kept constant at 80° C. After about 30 minutes precipitation is completed and stirring is continued for about a further 45 minutes. After cooling, the suspension is filtered and washed several times using warm water until free of chloride (checking by $AgNO_3$ test). The filter cake is then dried overnight at 80° C. and then ground.

The X-ray diffraction pattern shows an amorphous structure related to $\alpha$-$Fe_2O_3$ or $\gamma$-$Fe_2O_3$. The BET surface area is about 170 $m^2$/g, wherein the average pore diameters on the one hand are below 0.8 nm and on the other hand fairly close at 1.8 nm. After calcining for 30 minutes at 400° C., the BET surface area is about 54 $m^2$/g. X-ray diffraction shows a semi-crystalline $\alpha$-$Fe_2O_3$ phase (haematite). The gold particle diameter may thus be estimated at 4.5 nm by means of the Scherrer equation.

The sample contains 3.2 wt. % of Au (60% degree of deposition), based on the anhydrous oxide composition.

The kinetic CO conversion measurement at 80° C. in a fixed bed micro-reactor under differential flow conditions (gas atmosphere: 1% CO, 1% $O_2$, 75% $H_2$, remainder $N_2$) produces a CO conversion rate of $1.14.10^{-3}$ moles/s.g(Au). As the comparison with an Au/$MnO_x$ catalyst (Reference 1) in the following table known from Journal of Catalysis 168 (1997) 125–127 shows, the CO conversion rate for traditional Au/$Fe_2O_3$ catalyst material proves indeed to be greater by at least a factor 25, but is not yet satisfactory.

EXAMPLE 1

The process of comparative example 1 is repeated, with the exception that the precipitation is effected in the absence of tetrachloroauric acid. After precipitation, the suspension is cooled to 60° C. with stirring, and 30 ml of 0.1 molar tetrachloroauric acid solution are added dropwise in the course of 5 minutes at pH 8.0, buffered using $Na_2CO_3$ solution and then stirred for a further 30 minutes. The further working up is effected according to comparative example 1.

The BET surface area of the completely amorphous powder after drying is about 280 $m^2$/g. The corresponding catalyst data after calcining (likewise 30 minutes at 400° C.) are given in the following table. As can be seen, the activity (rate of CO oxidation per gram of gold) of the catalyst material of the invention is clearly increased compared to Reference 1 and comparative example 1.

EXAMPLE 2

35.9 g of $Fe(NO_3)_3.9H_2O$, 22.8 g of $Mg(NO_3)_2.6H_2O$ and 1.59 g of $HAuCl_4.3H_2O$ are dissolved in 180 ml of water and this solution, together with 1 M $Na_2CO_3$ solution, is added dropwise into a flashback chamber (400 ml) in the same manner as described in comparative example 1 at 85 to 90° C. and pH 7. In accordance with the further steps according to comparative example 1, a light brown powder is obtained after drying having a very amorphous basic structure, in which proportionally pyroaurite ($Mg_6Fe_2CO_3(OH)_{16}.4H_2O$) can be identified. Analysis of the decomposition precursor in the TGA apparatus supports the presence of this compound. After calcining (30 minutes at 400° C.), in spite of the excess of $Fe_2O_3$, the powder remains amorphous radiographically, as also confirmed by the high specific (BET) surface area of 190 $m^2$/g in the last line of the following table. The activity of the catalyst powder thus produced is comparable with the activity of the catalyst from Example 1 produced by the impregnation method.

TABLE

| System | Au content Wt. % | Diameter of Au Particles nm | Specific surface area (BET) $m^2$/g | Phases according to X-ray diffraction | Rate[a] mmoles $CO$/s.g-(Au) |
|---|---|---|---|---|---|
| Reference 1 | Au/$MnO_x$ | 5 | 2.8 | Not measured | $Mn_3O_4$ + remainder $MnCO_3$ | 0.05[b] |
| Comparative example 1 | Au/$Fe_2O_3$ | 3.2 | 4.5 | 54 | $\alpha$-$Fe_2O_3$ | 1.14 |
| Example 1 | Au/$Fe_2O_3$ | 2.3 | 2.5 | 60 | $\alpha$-$Fe_2O_3$ | 5.7 |
| Example 2 | Au/$Fe_2O_3$ with MgO | 2.3 | <4 | 190 | Amorphous | 4.6 |

[a] at 80° C. after 2 hours in 1% CO, 1% $O_2$, 75% $H_2$, remainder $N_2$
[b] 98% $H_2$, no $N_2$

What is claimed is:

1. Process for producing an Au/$Fe_2O_3$ catalyst material made from a particulate, co-catalytically active $Fe_2O_3$ support material having metallic Au clusters deposited on the $Fe_2O_3$ support material, said clusters having a diameter of less than 4.5 nm, said method comprising the following steps:
   a) reacting a water-soluble Fe(III) salt in an aqueous medium with a base, thereby forming a moist hydroxide gel;
   b) impregnating the moist hydroxide gel with a solution of a water-soluble Au compound to deposit complexed Au clusters on the surface of the hydroxide gel, thereby forming a suspension of reaction products;
   c) removing water from the suspension of reaction products, thereby forming a dried reaction product; and
   d) subjecting the dried reaction product to calcining at temperatures between 350 and 700° C.

2. Process for producing an Au/$Fe_2O_3$ catalyst material according to claim 1, wherein said catalyst contains furthermore at least one $Fe_2O_3$ sinter inhibitor selected from $Al_2O_3$, $Cr_2O_3$ and MgO, and which can be obtained by adding at least one water-soluble salt of Al, Cr or Mg in step a).

3. Process for producing an Au/$Fe_2O_3$ catalyst material according to claim 1, further comprising the steps of:
   adding at least one water-soluble salt of Al, Cr or Mg in step a).

4. Process for producing an Au/$Fe_2O_3$ catalyst material according to claim 1, wherein said catalyst material contains 2–8 wt. % Au.

5. Process for producing an Au/$Fe_2O_3$ catalyst material according to claim 1, having a specific BET surface area of at least about 50 $m^2$/g.

6. Process for producing an Au/$Fe_2O_3$ catalyst material according to claim 1, wherein the Au clusters have a diameter of less than 4 nm.

7. Catalyst material according to claim 6, wherein the Au clusters have a diameter of 1–3 nm.

8. Process according to claim 1, wherein steps a) and b) are carried out at temperatures of 40–95° C.

9. Process according to claim 1, wherein steps a) and b) are carried out at a pH value of 6–10.

10. Process according to claim 1, wherein metal hydroxides and/or metal carbonates are used as the base in step a).

11. Process according to claims 3, wherein the water soluble salt of Al, Cr or Mg is used in step a) in a proportion of 0.1–3.0 moles per mole Fe.

12. Process according to claims 1, wherein tetrachloroauric acid or tetranitratoauric acid is used as the water-soluble Au compound.

13. Process according to claim 1, wherein $Fe(NO_3)_3$ is used as the Fe(III) salt.

14. Process according to claim 8, wherein steps a) and b) are carried out at temperatures of 60–85° C.

15. Process according to claim 9, wherein steps a) and b) are carried out at a pH value of 7–9.

16. Process according to claim 10, wherein NaOH and/or $Na_2CO_3$ are used as the base in step a).

17. Process according to claim 11, wherein the water soluble salt of Al, Cr or Mg is used in step a) in a proportion of 0.1–1.0 mole per mole Fe.

18. Process according to claim 11, wherein the water soluble salt of Al, Cr or Mg is used in step a) in a proportion of 0.1–0.5 mole per mole Fe.

* * * * *